(12) United States Patent
Seshadri et al.

(10) Patent No.: US 12,333,835 B2
(45) Date of Patent: Jun. 17, 2025

(54) METHOD AND APPARATUS FOR DOCUMENT ANALYSIS AND OUTCOME DETERMINATION

(71) Applicant: Bloomberg L.P., New York, NY (US)

(72) Inventors: Madhavan Seshadri, Jersey City, NJ (US); Leslie Barrett, Warren, VT (US)

(73) Assignee: Bloomberg L.P., New York, NY (US)

( * ) Notice: Subject to any disclaimer, the term of this patent is extended or adjusted under 35 U.S.C. 154(b) by 327 days.

(21) Appl. No.: 18/059,451

(22) Filed: Nov. 29, 2022

(65) Prior Publication Data

US 2024/0177509 A1 May 30, 2024

(51) Int. Cl.
*G06V 30/18* (2022.01)
*G06N 3/084* (2023.01)

(52) U.S. Cl.
CPC ....... *G06V 30/18057* (2022.01); *G06N 3/084* (2013.01)

(58) Field of Classification Search
CPC .. G06V 30/18057; G06N 3/084; G06N 3/044; G06N 3/045; G06N 3/08; G06N 3/04; G06N 3/048; G06N 20/00; G06N 3/082; G06N 5/022; G06N 3/088; G06N 3/0455; G06N 3/09; G06N 3/006; G06N 3/02; G06F 40/30; G06F 40/284; G06F 40/295; G06F 17/16; G06F 3/0484; G06F 30/27; G06F 40/126; G06F 40/169; G06F 40/20
See application file for complete search history.

(56) References Cited

U.S. PATENT DOCUMENTS

| | | | | |
|---|---|---|---|---|
| 10,380,236 B1 * | 8/2019 | Ganu | | G06F 40/169 |
| 10,803,387 B1 * | 10/2020 | Setty | | G06F 40/30 |
| 10,824,815 B2 * | 11/2020 | Leibovitz | | G06F 40/30 |
| 10,956,819 B2 * | 3/2021 | Shazeer | | G06N 3/04 |
| 11,423,304 B2 * | 8/2022 | Liu | | G06V 10/764 |
| 11,568,503 B2 * | 1/2023 | Vacek | | G06N 3/08 |
| 11,663,407 B2 * | 5/2023 | Fusco | | G06F 40/295 |
| | | | | 704/9 |
| 12,050,870 B2 * | 7/2024 | Zhang | | G06F 40/205 |
| 12,079,629 B2 * | 9/2024 | Shalev | | G06N 3/0442 |
| 2017/0076001 A1 | 3/2017 | Salas et al. | | |
| 2019/0130273 A1 * | 5/2019 | Keskar | | G06F 40/47 |
| 2019/0325088 A1 * | 10/2019 | Dubey | | G06N 5/022 |
| 2019/0385254 A1 | 12/2019 | Vacek et al. | | |
| 2020/0012919 A1 | 1/2020 | Bathaee | | |

(Continued)

OTHER PUBLICATIONS

Alammar, "The Illustrated Transformer," 2018, retrieved from https://jalamar.github.io/illustrated-transformer/, 23 pgs.

(Continued)

*Primary Examiner* — Michael S Osinski
(74) *Attorney, Agent, or Firm* — Chiesa Shahinian & Giantomasi PC (57) ABSTRACT

A system for extracting useful information from the documents associated with various courts' dockets uses a bidirectional long short-term memory (BiLSTM)-Attention-conditional random fields (CRF) architecture having a multi-headed output layer producing an outcome and settlement classification. The system includes a BiLSTM layer, an attention layer, a CRF layer, and a sigmoid layer that interact to produce the outcome and settlement classification.

20 Claims, 5 Drawing Sheets

(56) References Cited

U.S. PATENT DOCUMENTS

| | | | | |
|---|---|---|---|---|
| 2020/0081909 | A1* | 3/2020 | Li | G06F 40/258 |
| 2020/0401938 | A1* | 12/2020 | Etkin | G06N 5/022 |
| 2021/0142103 | A1 | 5/2021 | Xie et al. | |
| 2021/0174028 | A1* | 6/2021 | Zhong | G06N 3/045 |
| 2021/0240929 | A1* | 8/2021 | Fei | G06N 3/047 |
| 2021/0248473 | A1* | 8/2021 | Shazeer | G06N 3/082 |
| 2021/0334659 | A1* | 10/2021 | Ding | G06N 3/08 |
| 2021/0366161 | A1* | 11/2021 | Wong | G06N 3/045 |
| 2022/0138534 | A1* | 5/2022 | Veyseh | G06F 17/16 706/15 |
| 2022/0156862 | A1 | 5/2022 | Rabinowitz et al. | |
| 2022/0221939 | A1* | 7/2022 | Yan | G06F 3/017 |
| 2022/0343444 | A1 | 10/2022 | Chan et al. | |
| 2023/0033114 | A1 | 2/2023 | Barrow et al. | |
| 2023/0119211 | A1* | 4/2023 | Cheng | G06N 5/01 705/305 |
| 2023/0222318 | A1* | 7/2023 | Lepikhin | G06N 3/084 706/25 |
| 2023/0368500 | A1* | 11/2023 | Ma | G06V 10/82 |
| 2023/0386646 | A1* | 11/2023 | Tanwani | G06V 10/806 |
| 2024/0070690 | A1* | 2/2024 | Zhang | G06Q 30/0202 |
| 2024/0127046 | A1* | 4/2024 | Lapointe | G06N 5/022 |
| 2024/0185072 | A1* | 6/2024 | Sakai | G06N 3/084 |
| 2025/0005327 | A1* | 1/2025 | Liu | G06N 3/0455 |

OTHER PUBLICATIONS

Arora et al., "A Simple but Tough-to-Beat Baseline for Sentence Embedding," 2017, 5th International Conference on Learning Representations, pp. 1-16.

"Bidirectional LSTM Explained—Papers with Code," retrieved Aug. 8, 2022, from https://paperswithcode.com/method/bilstm, 4 pgs.

Chang et al., "Trouble on the Horizon: Forecasting the Derailment of Online Conversations as they Develop," 2019, https://doi.org/10.48550/arXiv.1909.01362, 12 pgs.

"Pyro Documentation," retrieved Aug. 8, 2022, from https//docs.pyro.ai/en/stable/, 4 pgs.

Kementchedjhieva et al., "Dynamic Forecasting of Conversation Derailment," 2021, Proceedings of the 2021 Conference on Empirical Methods in Natural Language Processing, pp. 7915-7919.

Kingma et al., "Auto-Encoding Variational Bayes," 2014, retrieved from https://doi.org/10.48550/arXiv.1312.6114, 14 pgs.

Kipf et al., "Variational Graph Auto-Encoders," 2016, Bayesian Deep Learning (NIPS Workshops 2016), 3 pgs.

Lin et al., "Focal Loss for Dense Object Detection," 2017, International Conference on Computer Vision (ICCV), pp. 2980-2988.

Liu et al., "Forecasting the Presence and Intensity of Hostility on Instagram Using Linguistic and Social Features," 2018, Proceedings of the Twelfth International AAAI Conference on Web and Social Media (ICWSM 2018), pp. 181-190.

"LSTM—PyTorch 1 Documentation," retrieved Aug. 8, 2022 from https://pytorch.org/docs/stable/generated/torch.nn.LSTM.html, 3 pgs.

Mukhoti et al., "Evaluating Bayesian Deep Learning Methods for Semantic Segmentation," 2018, retrieved from https://doi.org/10.48550/arXiv.1811.12709, 13 pgs.

"pytorch-crf—pytorch-crf 0.7.2 documentation," retrieved on Aug. 8, 2022 from https://pytorch-crf.readthedocs.io/en/stable/, 5 pgs.

Raheja et al., "Dialogue Act Classification with Context-Aware Self-Attention," 2019, Proceedings of the 2019 Conference of the North American Chapter of the Association for Computational Linguistics: Human Language Technologies, vol. 1, pp. 3727-3733.

"Sigmoid—PyTorch 1.13 documentation," retrieved on Aug. 8, 2022, from https://pytorch.org/docs/stable/generated/torch.nn.Sigmoid.html, 2 pgs.

Vacek et al., "Litigation Analytics Case outcomes extracted from US federal court dockets," 2019, Proceedings of the Natural Legal Language Processing Workshop 2019, pp. 45-54.

"Variational Autoencoders—Pyro Tutorials 1.8.3 documentation," retrieved on Aug. 8, 2022, from https://pyro.ai/examples/vae.html, 12 pgs.

Vaswani et al., "Attention Is All You Need," 2017, 31st Conference on Neural Information Processing Systems (NIPS 2017), 11 pgs.

Wikipedia—Conditional random field, retrieved on Aug. 8, 2022, from https://en.wikipedia.org/wiki/Conditional_random_field, 6 pgs.

Bertalan et al., "Using attention methods to predict judicial outcomes", arXiv:2207.08823v2, 2022, 31 pgs.

Non-Final Office Action mailed Mar. 27, 2025 in connection with U.S. Appl. No. 18/310,689, filed May 2, 2023, 33 pgs.

Montelongo et al., "Tasks performed in the legal domain through Deep Learning: A bibliometric review (1987-2020)", 2020 International Conference on Data Mining Workshops (ICDMW), 2020, pp. 775-781.

Non-Final Office Action mailed Apr. 24, 2025, in connection with U.S. Appl. No. 18/310,712, filed May 2, 2023, 39 pgs.

* cited by examiner

METHOD AND APPARATUS FOR DOCUMENT ANALYSIS AND OUTCOME DETERMINATION

FIELD OF THE INVENTION

The present disclosure relates generally to data extraction, and more particularly to determining the progress and outcome of court cases.

BACKGROUND

Many processes and proceedings require the generation of multiple documents, often by multiple parties. Together, these documents provide details of the process or proceeding and often indicate the outcome of the process or proceeding. Although the information contained in these documents can be used to identify outcomes and patterns that led to specific outcomes, the sheer volume of documents prevents such an analysis.

With respect to the legal field, a docket comprises the documents associated with a case. Each case is assigned a docket number and documents associated with the case are identified using a unique docket number. From initial filing to final disposition, numerous documents may be generated. These dockets contain information that can be used to determine how various cases progressed to resolution. This information can be very useful in planning how to proceed in a new case that is still in progress. For example, this information can be used to determine various tendencies of judges, courts, and lawyers. Knowledge of these tendencies could be used to determine where 1) a case pertaining to particular subject matter would be best filed; and/or 2) a best path to move a case to a timely and desirable resolution.

However, in order to obtain the benefits described above, the documents of many different dockets must be reviewed document by document in order to identify information that may be helpful in deciding how to proceed with a particular case. The review process is long and tedious and can require hundreds or thousands of hours to complete. What is needed is a system and method for extracting useful information from the documents associated with various dockets.

SUMMARY

An apparatus is described including a sequence processing model layer configured to receive text of a document of a case and output an identification of a sequence of words of the text of the document of the case. The output of the sequence processing model layer is received by an attention layer configured to output data relating to relationships between the words of the text of the document of the case based on the sequence of words of the text of the document of the case. The output of the sequence processing model layer is received by a conditional random fields (CRF) layer configured to output an identification of an entry level outcome based on the output of the attention layer. The output of the attention layer is received by a sigmoid layer configured to output an entry level settlement based on the output of the attention layer. In one embodiment, the sequence processing model layer comprises a plurality of bidirectional long short-term memories (BiLSTMs) and each BiLSTM can comprise a forward direction LSTM and a backward direction LSTM. Each of the BiLSTMs can receive input from one of a plurality of smooth inverse frequency (SIF) embedding units. In one embodiment, the plurality of SIF embedding units encodes the text of the document and a plurality of one hot encoded entry type units inputs a vector representation to the plurality of SIF embedding units and each of the plurality of one hot encoded entry type units can receive an entry type and convert the entry type into the vector representation. In one embodiment, the CRF layer includes a plurality of CRF blocks and each of the plurality of CRF blocks is in communication with a neighboring CRF and the plurality of CRF blocks determine output of the CRF layer. In one embodiment, the plurality of CRF blocks collectively decide the output of the CRF layer.

Another apparatus is described having a BiLSTM layer including a plurality of BiLSTM components, each of the plurality of BiLSTM components configured to receive a tensor comprising text of a document of a case. The outputs of the plurality of BiLSTM components are received by an attention layer comprising a plurality of attention blocks each of which identify relationships between words of the document of the case, and output an output tensor. The apparatus includes a CRF layer having a plurality of CRF blocks configured to receive output tensors from each of the plurality of attention blocks and identify elements of the output tensors, the CRF blocks configured to output an entry level outcome based on the elements of the output tensors. In one embodiment, the CRF layer consists of weights associated with each boundary-type prediction (e.g., BIOE) for each word embedding (e.g., SIF embedding). The apparatus also has a sigmoid layer comprising a plurality of sigmoid blocks, each of the plurality of sigmoid blocks configured to receive an output tensor from one of the plurality of attention blocks and output an entry level settlement. In one embodiment, each of the plurality of BiLSTM components receives input from one of a plurality of SIF embedding units and the plurality of SIF embedding units encodes the text of the document and a plurality of one hot encoded entry type units inputs a vector representation to the plurality of SIF embedding units. In one embodiment, each of the plurality of CRF blocks is in communication with a neighboring one of the plurality of CRF blocks and the plurality of CRF blocks determine output of the CRF layer.

A method is described including the step of receiving text of a document of a case at a sequence processing model layer. An identification of a sequence of words of the text of the document of the case is output from the sequence processing model layer. Output of the sequence processing model layer is received at an attention layer which identifies relationships between the words of the text of the case based on the sequence of words of the text of the case. The identification is output from the attention layer to a CRF layer which outputs an identification of an entry level outcome based on the output of the attention layer. In one embodiment, the entry level settlement output is based on the output of the sigmoid layer and the attention layer and output directly.

DETAILED DESCRIPTION

Figure 1:
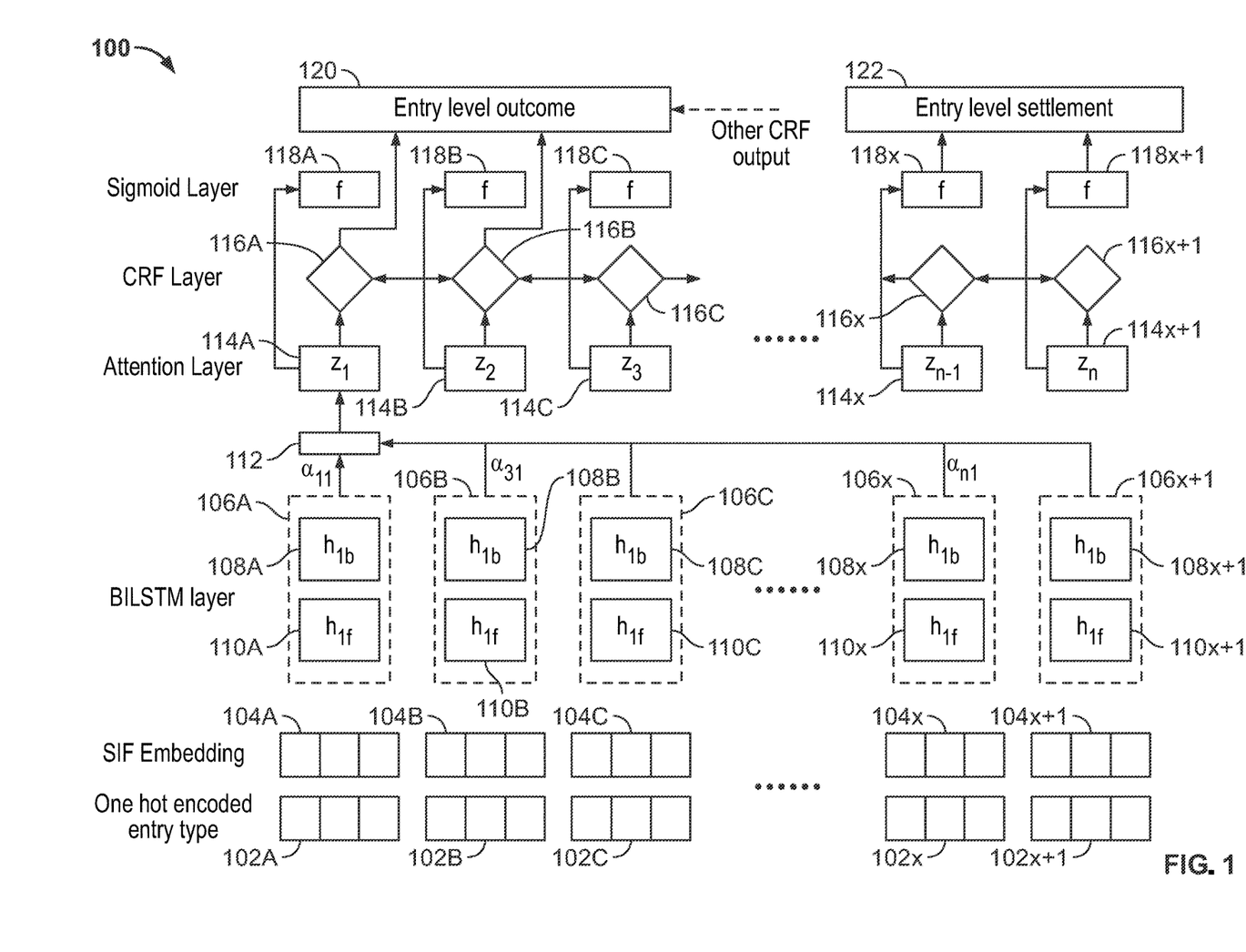
FIG. 1 shows an architecture for analyzing documents associated with dockets according to one embodiment.

FIG. 1 shows a system 100 implementing an algorithm for analyzing documents associated with dockets according to one embodiment. In this embodiment, the system is a bidirectional long short-term memory (BiLSTM)-Attention-conditional random fields (CRF) architecture having a multi-headed output layer producing an entry level outcome and an entry level settlement. An entry level outcome of a case identifies the outcome of a case. For example, the entry level outcome can indicate whether a case was dismissed or settled or whether a default judgment, summary judgment, or verdict was issued. Entry level settlement is a classification that has only two possibilities—settled or not settled. In this embodiment, X number of the last entries of a docket and X number of the last entry types of that docket are input to the algorithm and an entry level outcome and entry level settlement are output from the algorithm.

One hot encoded entry type units 102A-102X+1 each receive an input which is one of approximately 20 different entry types that are used according to one embodiment. The entry types can be, for example, a motion, an order, a letter, a complaint, etc. It should be noted that a number of one hot encoded entry type units can be used depending on how many are required for a particular implementation. Each of the one hot encoded entry type units 102A-102X+1 converts each entry type into a vector representation where the element $x\_\{i\}$ in vector x will be 1 if the entry type is present and 0 otherwise.

In one embodiment, specific categories are identified for eighteen entry types, namely: order, motion, other, notice, brief, minute, summon, complaint, answer, certificate, affidavit, letter, statement, stipulation, report, error, transcript, disclosure, coversheet, prose. For each of the entry, if it is classified into a specific category, then the corresponding element in the vector will contain the value of 1 and all other elements will be 0. For example, if the entry text is of the type complaint, then the corresponding vector may be represented as [0,0,0,0,0,0,0,1,0,0,0,0,0,0,0,0,0,0] where the complaint type is the eighth element in the vector. In one embodiment, the process starts with assigning positions to each of the types in the vector and assigning a value of 1 if the entry text is of that type and 0 otherwise.

Smooth inverse frequency (SIF) embedding units 104A-104X+1 receive text of each case comprising words and sentences and convert the text into a tensor (e.g., a vector) representation. In one embodiment, SIF embedding units 104A-104X+1 each compute the weighted average of word vectors in text forming a sentence of a case and then remove the projections of the average vectors on their first singular vector (referred to as common component removal). Here the weight of a word w is $a/(a+p(w))$ where a is a parameter and $p(w)$ is the (estimated) word frequency.

In one embodiment, each entry text in the docket can be classified into one of the entry type categories as described above. This forms the representation of the type of the entry. The SIF embeddings form a vector representation of the content in the entry text. Both the representations of the type and content are concatenated together and used for further processing in the deep learning model.

It should be noted that the " . . . " shown in FIG. 1 located between one hot encoded entry type units 102C and 102X and SIF embedding units 104C and 104X indicate that there can be any number of one hot encoded entry type units and SIF embedding units between the associated "C" unit and "X" units.

The BiLSTM layer (also referred to as a sequence processing model layer) comprises a plurality of BiLSTM components 106A-106X+1. Each BiLSTM receives input from a respective SIF embedding unit (i.e., one of SIF embedding units 104A-104X+1) as a tensor associated with a word in the text of a case. Each of BiLSTM components 106A-106X+1 is a sequence processing model that consists of two LSTMs: a forward direction LSTM $h_{1b}$ and a backward direction LSTM $h_{1f}$. As shown in FIG. 1, BiLSTM 106A comprises LSTM $h_{1b}$ 108A and LSTM $h_{1f}$ 110A. Similarly, BiLSTM 106B comprises LSTM $h_{1b}$ 108B and LSTM hit 110B and BiLSTM 106C through BiLSTM 106X+1 comprise their respective LSTM $h_{1b}$s and LSTM his and output a representation using the same LSTMs as in $h_{1b}$ and $h_{1f}$.

In one embodiment, there is a singular stack of BiLSTMs which process inputs received via BiLSTM components 106A through 106X+1. At each step in the processes a BiLSTM component encodes a representation of a current state based on an input in a sequence. In this embodiment, BiLSTM components 106A through 106X+1 form a representation of a sequence of events up to a point in time. In such embodiments, in a stack of BiLSTM components, the output of the first BiLSTM component, on receiving the first input representation, is input to the second BiLSTM to produce an output representation (i.e., each BiLSTM component in the stack will produce an output for each input representation, however each BiLSTM component in the stack will operate sequentially on the output of the same representation in the previous BiLSTM component on the stack.

In one embodiment, the bidirectionality of the BiLSTM components increase the amount of information available to the system and improves the context available to the algorithm of the system (e.g., identifying what words immediately follow and precede a word in a sentence). In one embodiment, the BiLSTM layer receives text of a case and outputs an identification of a sequence of the words of the text in the case. In one embodiment, the BiLSTM layer is implemented using a PyTorch implementation of the LSTMs.

In one embodiment, the outputs of each of BiLSTM components 106A-106X+1 are tensors $\alpha_{11}$ through $\alpha_{n1}$ collected in buffer 112 before being input to attention block $Z_1$ 114A of the attention layer. Buffer 112 attends to the learnt representation of all the tensors corresponding to the specific (entry type, entry text) of each such occurrence in the docket. This forms as an input to each of the attention blocks in z_i.

In one embodiment, each attention block $Z_1$ 114A-$Z_n$ 114X+1 comprises a plurality of encoders receiving the tensors from buffer 112. Each encoder is in communication with a respective decoder. Together, the encoder and decoder of attention blocks $Z_1$ 114A-$Z_n$ 114X+1 identify relationships between words of a sentence in the text of a case as well as words of other sentences in the text of the case. In one embodiment, attention blocks in $Z_2$-$Z_n$ receive the tensors in the same way as $Z_1$. This process is not shown in order to reduce the complexity of the illustrative figure. Each of the attention blocks receives information from the output of BiLSTM components in the previous layer.

In one embodiment, the attention layer is configured to receive the output of the sequence processing model layer (i.e., the BiLSTM layer) and output data pertaining to the relationships between the words of the text of the case based on the sequence of words of the text of the case. In one embodiment the output of each attention block is a tensor and the tensor output of each attention block (also referred to as an output tensor) is output to a CRF layer and a sigmoid block of a sigmoid layer. As shown in FIG. 1, the output of attention block $Z_1$ is input to CRF block 116A. Similarly, the output of attention blocks $Z_2$ through $Z_n$ are input to CRF blocks 116B through 116X+1 and sigmoid blocks 118B through 118X+1, respectively.

In one embodiment, each CRF block 116A through 116X+1 receives the output of an associated attention block (e.g., an output tensor) as input and identifies elements of the output tensor based on a particular element as well as neighboring elements (e.g., words of the text of a case) of neighboring CRF blocks. Each CRF block 116A through 116X+1 uses a conditional random field for structured prediction in output spaces where the output of one element is conditionally dependent on its neighboring element predictions in a sequence. In one embodiment, for an outcome classification problem, a prediction for each element is produced for each of a number of entries (e.g., 10 entries) in a docket that is being analyzed. In one embodiment, the CRF layer is configured to receive the output of the attention layer and output an identification of an entry level outcome based on the output of the attention layer. In one embodiment, CRF blocks 116A through 116X+1 are implemented using PyTorch CRFs.

The output of each CRF block 116A through 116X+1 are input to adjacent CRF blocks. In one embodiment, the inputs are conditional given the input to adjacent CRF blocks. In one embodiment, the output of each CRF block 116A through 116C is an entry level outcome 120 based on the elements of the output tensors.

In one embodiment, each sigmoid block 118A through 118X+1 receives input (i.e., an output tensor) from an associated attention block 114A through 114X+1 respectively. In one embodiment, the input is concatenated for all entries in the docket and each sigmoid block produces a score between 0 and 1. If the score is greater than 0.5, the docket is identified as having a settlement. If the score is less than 0.5, then a settlement of 0 is identified. An entry level settlement is output based on the score. In one embodiment, the sigmoid layer is configured to receive the output of the attention layer and output an entry level settlement based on the output of the attention layer. In one embodiment, sigmoid blocks 118X through 118X+1 output information to entry level settlement 122. Output of all the units in the attention layer is input into (1) the CRF layer, (2) the sigmoid layer. In one embodiment, for the settlement calculation, all the units in the sigmoid layer are used. In FIG. 1, the arrows showing the output of 118A-118C to the entry Level Settlement output is not shown for clarity. Similarly, for 116X-116X+1 have output connections to the outcome prediction layer which are not shown explicitly in the diagram for clarity.

In one embodiment, the CRF layer produces conditional output to classify each of the entries in the input. The output of entry i is conditionally dependent on entries i−1 and i+1. The sigmoid layer operates independently and classifies if an entry contains a settlement or not. This is how entry level settlement and classification entries are produced. The output is structured this way due to the fact that settlement indicators can be present in multiple entries which may be located far away from each other in the related docket. A docket is considered to have a settlement if any of the entries have been classified to contain settlement.

It should be noted that the " . . . " shown in FIG. 1 located between attention layer blocks 114C and 114X, CRF layer blocks 116C and 116X, and sigmoid layer blocks 118C and 118X indicate that there can be any number of attention layer blocks, CRF layer blocks, and sigmoid layer blocks between the associated "C" block and "X" block. In one embodiment, focal loss is needed as a loss function for settlements due to the data being imbalanced.

In one embodiment, system 100 is trained prior to use using the following focal loss function:

$$FL(p_t) = -\alpha_t(1-p_t)^\gamma \log(p_t).$$

where $\alpha_t$ is a weighting factor, pt=(p if y=1; 1−p otherwise), and $(1-pt)^\gamma$ is a modulating factor to a cross entropy loss.

In one iteration of training a deep learning model, the loss function signifies how far off the current prediction is from the target label. A higher loss value signifies a worse prediction and vice versa. The objective for the deep learning model is to learn the parameters in the network that minimize this representation of the problem. The loss function is a convex loss function and the parameters are updated for the subsequent iteration by updating the weights back-propagation. In one embodiment, the updates are controlled by a learning rate which determines how big the updates are with respect to the loss.

In one embodiment, the overall loss function is:

$$Loss = CRF\ Loss + Focal\ Loss$$

In one embodiment, the overall loss function functions the same way as described above. In one embodiment, focal loss is for minimizing the error in settlement prediction and CRF loss is for minimizing the error in outcome prediction. A combined loss function is used to learn the overall objective function.

Figure 2:
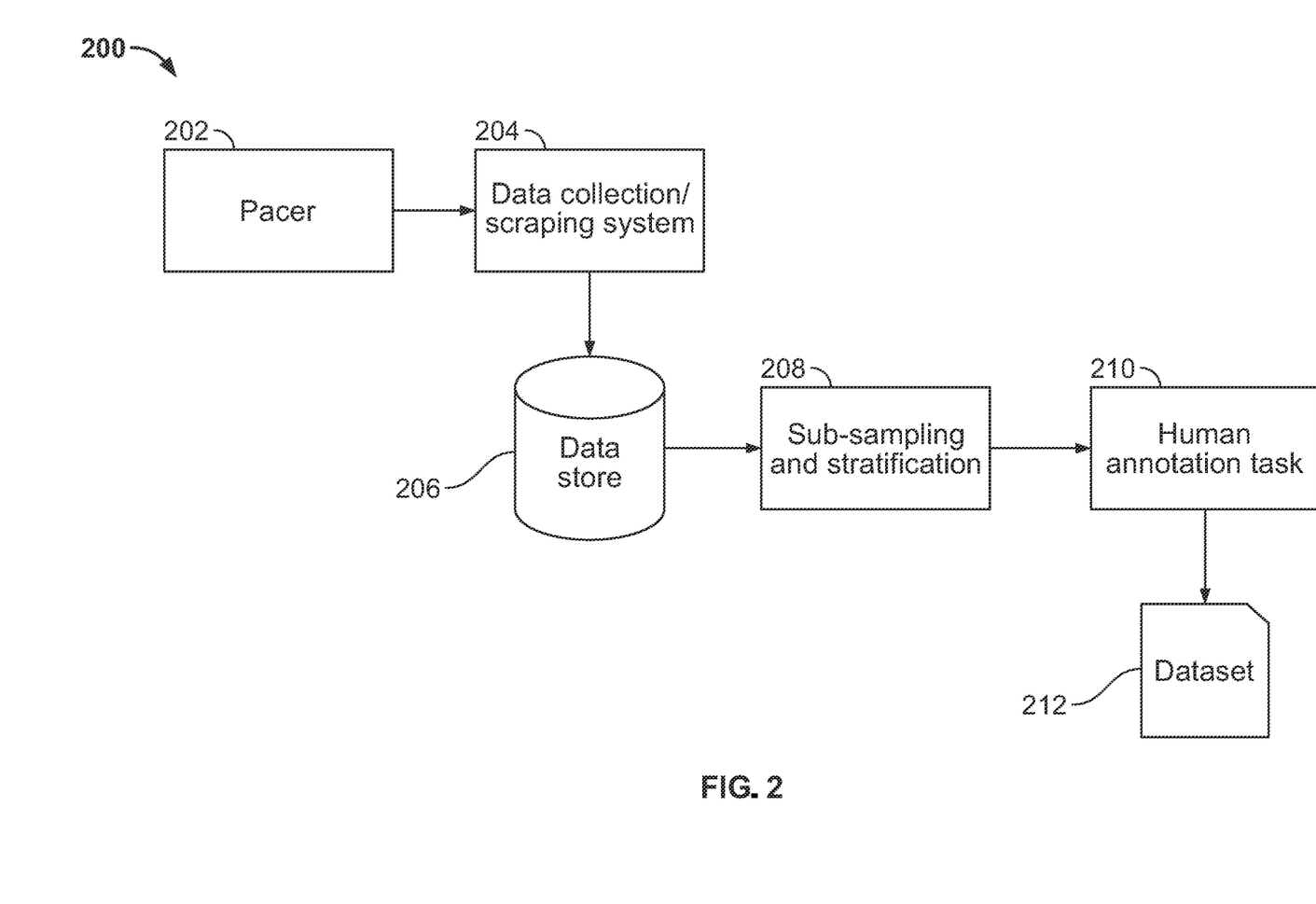
FIG. 2 shows a data collection apparatus according to one embodiment.

In one embodiment, the system is trained using training data that can be acquired using various methods. FIG. 2 shows a data collection apparatus 200 according to one embodiment for generating training data. Public Access to Court Electronic Records (PACER) service 202 provides electronic public on-demand access to U.S. federal court records. In one embodiment, court records from PACER 202 are retrieved by data collection/scraping system 204. In one embodiment, data collection/scraping system 204 periodically accesses PACER service 202 and collects information on court dockets having new entries. Data collection/scraping system 204 converts information from PACER service 202 to a normalized format and transmits the information in the normalized format to data store 206. In one embodiment, data store 206 stores the data collected from PACER service 202 in the normalized format it is received in from data collection/scraping system 204. Sub-sampling and stratification unit 208 identifies cases and eliminates some cases based on number codes (e.g., criminal cases). Other cases may be eliminated from consideration if they are identified to be in categories that are not well represented by available data. In one embodiment, sub-sampling and stratification unit 208 identifies dockets having 10 or more entries and randomly samples a number of those dockets. Human annotation task unit 210 receives user input regarding entries. In one embodiment, human annotation task unit 210 receives user input regarding the last 10 entries of each docket. The user input can identify an outcome of a case of the docket based on the entry and which outcome category the entry belongs to. In one embodiment, user input is also received identifying whether or not a case has been settled. Data from human annotation task unit 210 is output as dataset 212 which can be stored for use by system 100.

Figure 3:
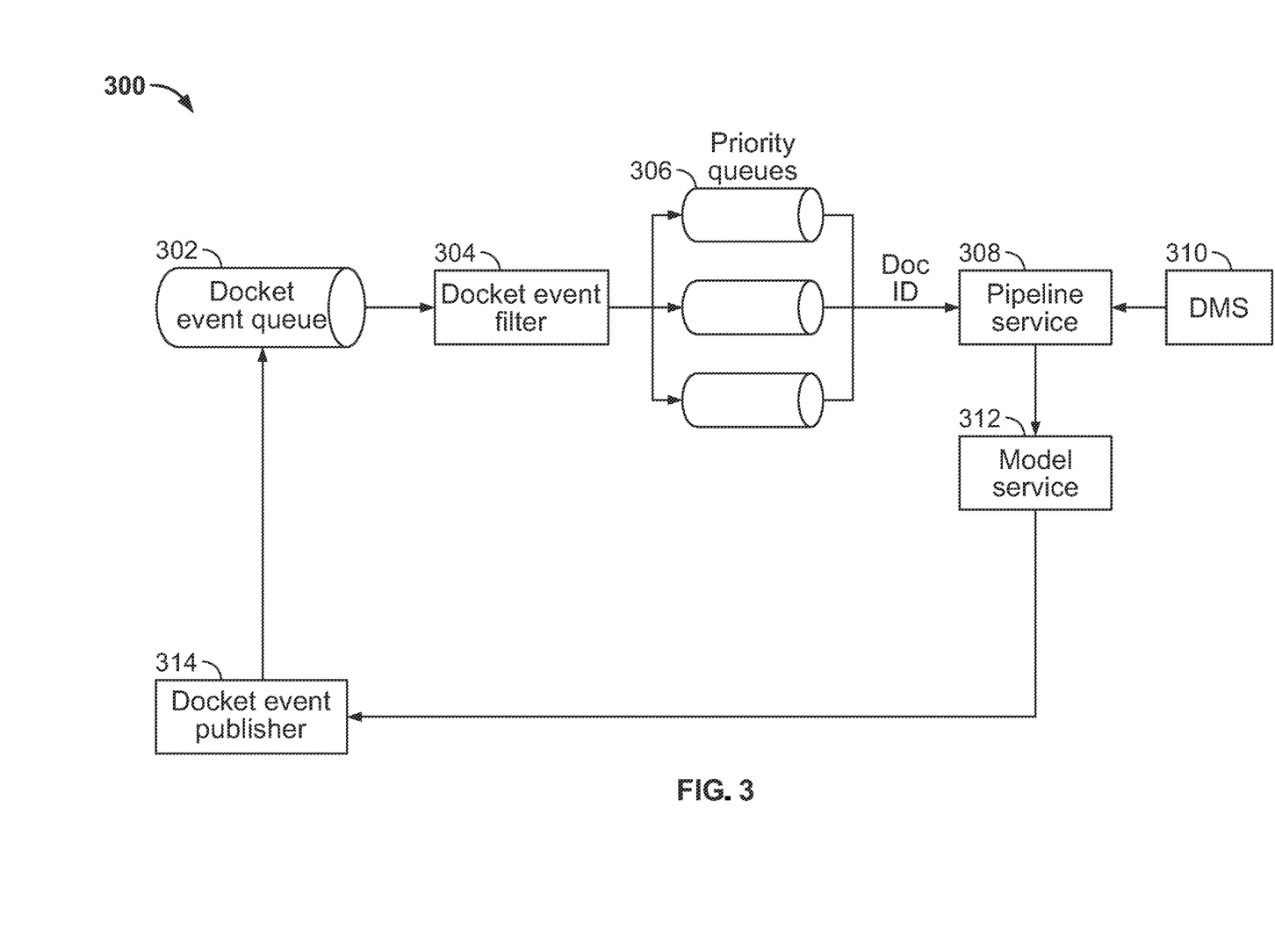
FIG. 3 shows a pipeline architecture according to one embodiment.

FIG. 3 shows architecture for pipeline 300 according to one embodiment. The trained model implementing the algorithm shown in FIG. 1 based on the training data from the data collection system shown in FIG. 2 is packaged as an API service 312 shown in FIG. 3. Docket event queue 302, in one embodiment, is a Kafka-type queueing system, which manages docket publishing and allows messages in the queue that contains docket information to be retrieved and used by different systems. Information from docket event queue 302 is received by docket event filter 304. In one embodiment, docket event filter 304 analyzes docket events from docket event queue 302 and filters messages that should be sent to different systems. Docket event filter 304 continually analyzes docket events from docket event queue 302 in order to create new dockets and update existing dockets with new information. In one embodiment, docket event filter 304 filters dockets based on various criteria such as date created, court category, case status, and nature of suit. For example, a docket may be filtered based on the docket being created after the year 2000, the docket having a court category of FED_CV, a case status identified as closed, and a particular nature of suit code. These filtered dockets are then published to priority queues 306. In one embodiment, priority queues are an internal Kafka-type queueing system that manages docket publishing for other systems and allows messages in the queue that contain docket information to be transmitted to and used by pipeline service 308. In one embodiment, different queues can be created and used for different purposes. Pipeline service 308 retrieves the text and filing type of each docket entry from a document management system (DMS) 310 using a docket id received from priority queues 306. In one embodiment, pipeline service 308 transforms information received from DMS 310 into a model input format that is transmitted to model service 312. In one embodiment, model service 312 receives the text and filing type of each docket entry as model input and generates an outcome and settlement classification of each entry as model output. Model service 312 can be a python API service which wraps around the case outcomes model. Data from model service 312 is transmitted to docket event publisher 314. In one embodiment, docket event publisher 314 is an interface for publishing docket events to docket event queue 302. After calling model server 312 to retrieve model output, pipeline service 308 transforms the model output to the format of messages to be published and uses docket event publisher 314 to publish the messages to docket event queue 302. After the data is collected from the data collection system shown in FIG. 2, the dataset 212 is used as training data and fed to the model shown in FIG. 1 which implements the algorithm for analyzing documents associated with dockets according to one embodiment in system 100. The trained model is then packaged as an API service 312 which takes model inputs and generates model results in the live system shown in FIG. 3.

Figure 4:
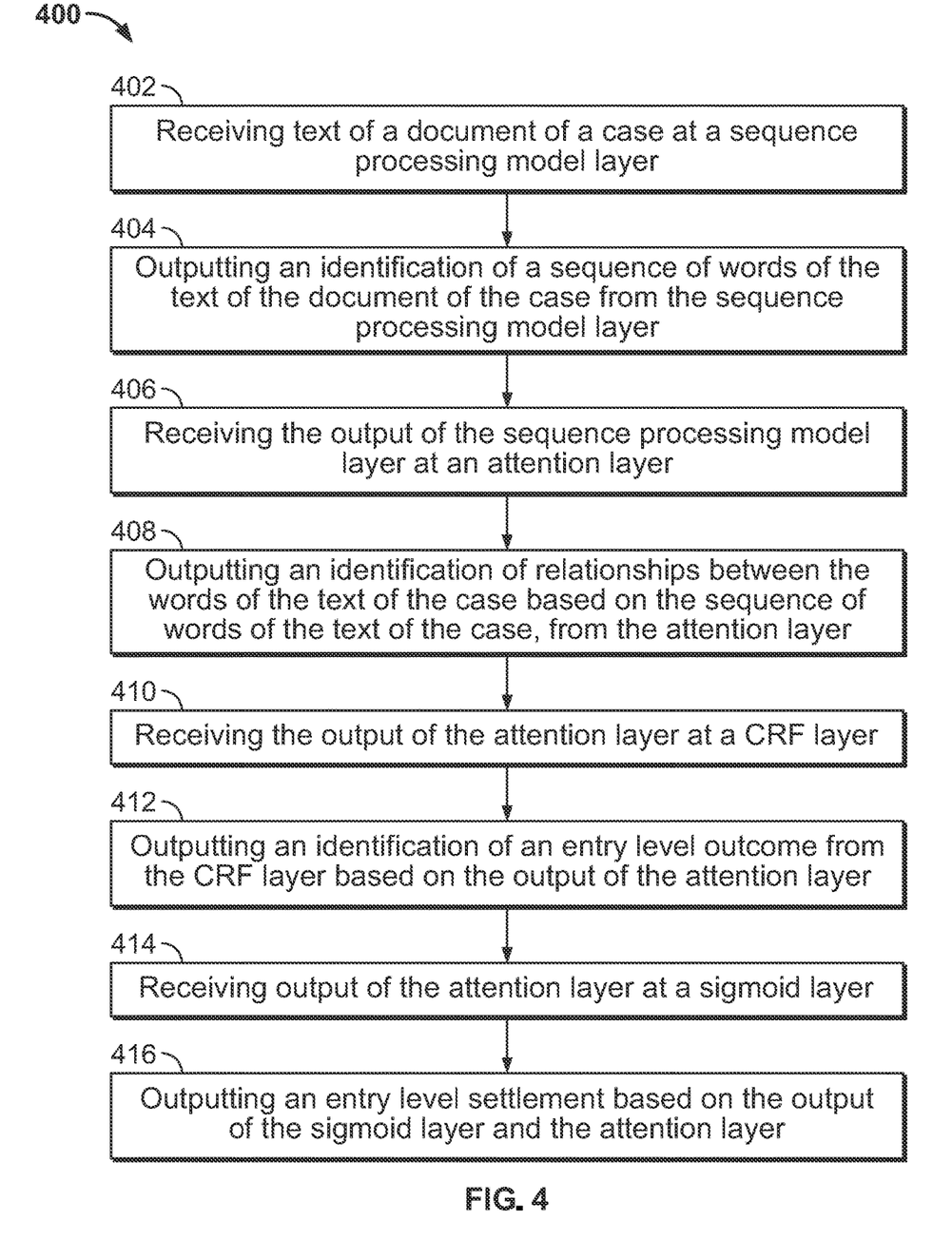
FIG. 4 shows a flowchart of a method according to one embodiment.

FIG. 4 shows an embodiment of a method 400 of system 100 implemented in FIG. 1 for analyzing documents associated with dockets. Method 400 shown in FIG. 4 is provided to enhance the clarity of the description of the operation of system 100 shown in FIG. 1. At step 402, text of a document of a case is received at a sequence processing model layer. At step 404, an identification of a sequence of words of the text of the document of the case is output from the sequence processing model layer. At step 406, the output of the sequence processing model layer is received at an attention layer. At step 408, an identification of relationships between the words of the text of the case based on the sequence of words of the text of the case is output from the attention layer. At step 410, the output of the attention layer is received at a CRF layer. At step 412, an identification of an entry level outcome is output from the CRF layer based on the output of the attention layer. At step 414, output of the attention layer is received at a sigmoid layer. At step 416, an entry level settlement based on the output of the sigmoid layer and the attention layer is output.

Figure 5:
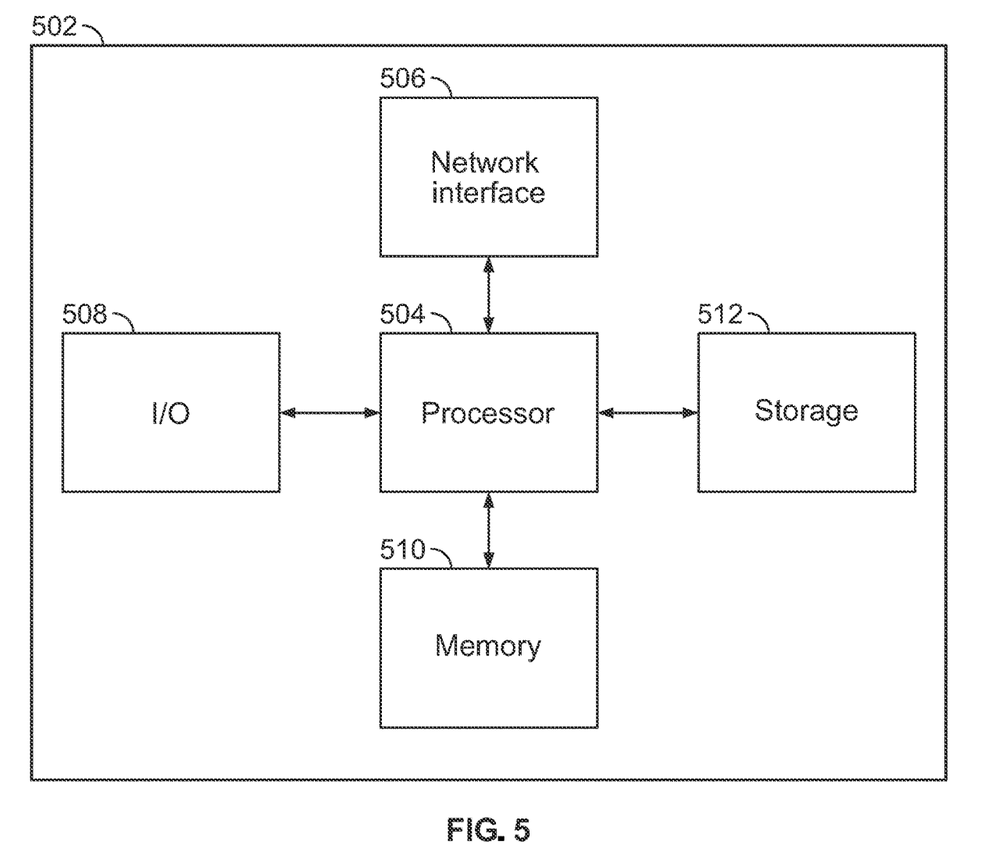
FIG. 5 shows a computer that can be used to implement the methods, systems, and apparatuses described herein.

A computer can be used to implement the methods, systems, and apparatuses described herein. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the components, operations, and methods shown in of FIGS. 1-4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm shown in FIGS. 1 and 4. Accordingly, by executing the computer program instructions, the processor 504 executes an algorithm shown in FIGS. 1 and 4. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high-level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:
1. An apparatus comprising:
a sequence processing model layer configured to receive text of a document of a case and output an identification of a sequence of words of the text of the document of the case;
an attention layer configured to receive the output of the sequence processing model layer and output data relating to relationships between the words of the text of the document of the case based on the sequence of words of the text of the document of the case;
a conditional random fields (CRF) layer configured to receive the output of the attention layer and output an identification of an entry level outcome based on the output of the attention layer; and a sigmoid layer configured to receive the output of the attention layer and output an entry level settlement based on the output of the attention layer.

2. The apparatus of claim 1, wherein the sequence processing model layer comprises a plurality of bidirectional long short-term memory (BiLSTM) components.

3. The apparatus of claim 2, wherein each of the plurality of BiLSTM components comprises a forward direction long short-term memory (LSTM) and a backward direction LSTM.

4. The apparatus of claim 3, wherein each of the plurality of BiLSTM components receives input from one of a plurality of smooth inverse frequency (SIF) embedding units.

5. The apparatus of claim 4, wherein the plurality of SIF embedding units encodes the text of the document and a plurality of one hot encoded entry type units inputs a vector representation to the plurality of SIF embedding units.

6. The apparatus of claim 5, wherein each of the plurality of one hot encoded entry type units is configured to receive an entry type and convert the entry type into the vector representation.

7. The apparatus of claim 1, wherein the CRF layer comprises a plurality of CRF blocks.

8. The apparatus of claim 7, wherein each of the plurality of CRF blocks is in communication with a neighboring CRF and the plurality of CRF blocks determine output of the CRF layer.

9. An apparatus comprising:
a BiLSTM layer comprising a plurality of BiLSTM components each of the plurality of BiLSTM components configured to receive a tensor comprising text of a document of a case;
an attention layer comprising a plurality of attention blocks, each attention block configured to receive outputs of the plurality of BiLSTM components, identify relationships between words of the document of the case, and output an output tensor;
a CRF layer comprising a plurality of CRF blocks, each of the plurality of CRF blocks configured to receive output tensors from each of the plurality of attention blocks and identify elements of the output tensors, the plurality of CRF blocks configured to output an entry level outcome based on the elements of the output tensors; and
a sigmoid layer comprising a plurality of sigmoid blocks, each of the plurality of sigmoid blocks configured to receive an output tensor from one of the plurality of attention blocks and output an entry level settlement.

10. The apparatus of claim 9, wherein each of the plurality of BiLSTM components comprises a forward direction LSTM and a backward direction LSTM.

11. The apparatus of claim 9, wherein each of the plurality of BiLSTM components receives input from one of a plurality of SIF embedding units.

12. The apparatus of claim 11, wherein the plurality of SIF embedding units encodes the text of the document and a plurality of one hot encoded entry type units inputs a vector representation to the plurality of SIF embedding units.

13. The apparatus of claim 12, wherein each of the plurality of one hot encoded entry type units is configured to receive an entry type and convert the entry type into the vector representation.

14. The apparatus of claim 9, wherein each of the plurality of CRF blocks is in communication with a neighboring one of the plurality of CRF blocks and the plurality of CRF blocks determine output of the CRF layer.

15. A method comprising:
receiving text of a document of a case at a sequence processing model layer;
outputting an identification of a sequence of words of the text of the document of the case from the sequence processing model layer;
receiving the output of the sequence processing model layer at an attention layer;
outputting an identification of relationships between the words of the text of the case based on the sequence of words of the text of the case, from the attention layer;
receiving the output of the attention layer at a CRF layer;
outputting an identification of an entry level outcome from the CRF layer based on the output of the attention layer;
receiving output of the attention layer at a sigmoid layer; and
outputting an entry level settlement based on the output of the sigmoid layer and the attention layer.

16. The method of claim 15, wherein the sequence processing model layer comprises a plurality of BiLSTM components.

17. The method of claim 16, wherein each of the plurality of BiLSTM components comprises a forward direction LSTM and a backward direction LSTM.

18. The method of claim 17, wherein a first of the plurality of BiLSTM components receives an encoded representation from one of the plurality of BiLSTM components and the other plurality of BiLSTM components receive input from one of a plurality of SIF embedding units.

19. The method of claim 18, wherein the plurality of SIF embedding units encodes the text of the document and a plurality of one hot encoded entry type units inputs a vector representation to the plurality of SIF embedding units.

20. The method of claim 19, wherein each of the plurality of one hot encoded entry type units is configured to receive an entry type and convert the entry type into the vector representation.

* * * * *